United States Patent Office 3,156,705
Patented Nov. 10, 1964

3,156,705
PRODUCTION OF DICARBOXYLIC ACID ANHYDRIDES BY THE CATALYTIC OXIDATION OF OLEFINS
Ralph O. Kerr, Houston, Tex., assignor to Petro-Tex Chemical Corporation, Houston, Tex., a corporation of Delaware
No Drawing. Filed Dec. 14, 1960, Ser. No. 75,655
7 Claims. (Cl. 260—346.8)

This invention relates to an improved process for the manufacture of dicarboxylic acid anhydrides by catalytic oxidation of ethylenically unsaturated hydrocarbons and relates more particularly to an improved process for producing monoethylenically unsaturated aliphatic dicarboxylic acid anhydrides such as maleic anhydride by reacting a mixture of an oxygen-containing gas and an ethylenically unsaturated hydrocarbon in vapor phase in the presence of a novel catalyst therefor.

Production of dicarboxylic acid anhydrides by vapor phase catalytic oxidation of hydrocarbons is well known. The principal method currently employed for making maleic anhydride is by the catalytic oxidation of benzene in the presence of certain heavy metal oxide catalysts. Although catalysts for the oxidation of unsaturated aliphatic hydrocarbons are known, the yields of the desired maleic anhydride product over the known catalysts are not substantially high enough to make such processes commercially attractive as compared to maleic anhydride prepared from benzene. More efficient conversion of the hydrocarbon to maleic anhydride and longer life catalysts are desirable.

It is, accordingly, an object of this invention to provide an improved process for obtaining high yields of dicarboxylic acid anhydrides by vapor phase oxidation of olefins. It is another object of this invention to provide an improved process for the vapor phase oxidation of monoolefins, particularly butene-2 to maleic anhydride, in yields greater than about 70 weight percent. It is a further object of this invention to provide a novel and improved catalyst useful in obtaining increased yield of product by vapor phase catalytic oxidation of olefins to aliphatic dicarboxylic acid anhydrides, and a method for making the same. Another object is to produce catalysts of long life. Other objects and advantages of the invention will be apparent from the description thereof which follows.

It has now been found that particular vanadium-oxygen-phosphorus complex type catalysts containing a minor amount of a phosphorus stabilizer are effective in converting olefins to dicarboxylic acid anhydrides at yields as high as about 90 weight percent or more under the reaction conditions specified hereinafter. This substantial increase in conversion over that obtained in the prior art has obvious economic advantages. These catalysts are characterized by improved long life, particularly because of the presence of the phosphorus stabilizer.

The phosphorus stabilizer of the catalyst is an element or mixture of elements selected from arsenic, chromium, the rare earth elements and metals from Groups[1] Ib, IIb, IIIa, IIIb, IVa, IVb, Va, and the metals in the fourth period of Group VIIIb. The preferred elements are copper, silver, zinc, cadmium, aluminum, gallium, indium, scandium, yttrium, lanthanum, germanium, tin, lead, titanium, zirconium, antimony, bismuth, arsenic, iron, cobalt, nickel, cerium, praseodymium, neodymium and chromium and mixtures thereof. These elements may be introduced either as the element itself or through the use of compounds of the elements.

The novel catalysts of this invention contain vanadium, oxygen, phosphorus, and the phosphorus stabilizer chemically bonded together as a complex.

The atomic ratio of phosphorus to vanadium should be maintained between about one to two atoms of phosphorus per atom of vanadium. Preferably, the ratio of atoms of phosphorus to atoms of vanadium is from about 1.1 to 1.6 atoms of phosphorus per atom of vanadium. The phosphorus stabilizer should be present in a total amount from about 0.05 to about 5.0 percent, and more preferably from about 0.2 to about 2.0 weight percent of the element based on the total weight of vanadium, oxygen and phosphorus.

The catalysts are prepared by combining the vanadium with a phosphorus compound. A vanadium oxysalt may be used wherein the anion of the acid used to form the vanadium oxysalt is more volatile than the anion of phosphoric acid. That is, the anion used is an anion of an acid which is more volatile than phosphoric acid. When the vanadium oxysalt is combined with the phosphorus compound a vanadium-oxygen-phosphorus complex is formed. The vanadium oxysalt may be either added as such or formed in situ during the preparation of the vanadium-oxygen-phosphorus complex. The phosphorus stabilizer may be introduced into the catalyst in a number of ways. The method of introduction of this added phosphorus stabilizer may be any method used which results in the added stabilizer being intimately and chemically combined with the vanadium-oxygen-phosphorus complex. The added phosphorus stabilizer may be added during the preparation of the vanadium-oxygen-phosphorus complex, or the complex may first be prepared and the phosphorus stabilizer added either before, at the same time, or after either the vanadium or phosphorus compound is added. The phosphorus stabilizer may be added before, after, or at the same time as the carrier, if any, is added. If the phosphorus stabilizer contains more than one compound, these compounds may be added either together or separately, either before, during or after the reaction of the vanadium compound with the phosphorus compound.

Catalyst complexes which are prepared by a solution method are valuable catalysts for this invention. For example, if vanadium oxychloride is used, the solvent may be hydrochloric acid. The vanadium oxychloride solution may be readily obtained by dissolving vanadium pentoxide in concentrated hydrochloric acid. The phosphorus may then be introduced by adding a phosphorus compound such as phosphoric acid or $P_2O_5$ to the vanadium oxychloride to form the vanadium-oxygen-phosphorus complex dissolved in the hydrochloric acid. The added phosphorus stabilizer is normally dissolved along with the vanadium pentoxide in hydrochloric acid, or if, for example, vanadium oxychloride is the starting material, it may be dissolved in a solution thereof prior to the addition of phosphoric acid or $P_2O_5$. The rate of formation of the complex may be increased with the use of heat.

The vanadium oxysalt used in the preparation of the catalyst may desirably have as the salt forming anion any anion of an acid which is more volatile than the anion of phosphoric acid and which is not normally an oxidizing agent for vanadium during the catalyst preparation. The acid precursor of the anion may be either organic or inorganic. Acids such as hydrochloric, hydroiodic, hydrobromic, acetic, oxalic, malic, citric, formic and mixtures thereof such as a mixture of hydrochloric on oxalic may be used. Less desirably, sulfuric and hydrofluoric may be employed. Other reducing agents which may be employed, but which have not given as desirable cata- ---
[1] These groups are based on the Periodic Table as found in Smith's Introductory College Chemistry, 3rd ed. (1950) by William F. Ehret (Appleton-Century-Crofts, Inc.).

lysts are organic aldehydes such as formaldehyde and acetaldehyde; alcohols such as pentaerythritol, diacetone alcohol and diethanol amine, and additional reducing agents such as hydroxyl amines, hydrazine, sulphur dioxide and nitric oxide. Nitric acid and similar oxidizing acids which would oxidize the vanadium from a valence of 4 to 5 during the preparation of the catalyst should be avoided. Vanadium oxysalts formed from the inorganic acids have given excellent results, and the best results have been obtained using the salt from hydrochloric acid; that is, using vanadium oxychloride.

The phosphorus stabilizer may be added as the element or elements per se or as the compounds thereof such as the oxides, hydroxides, carbonates, phosphates, nitrates, sulfates, and inorganic or organic salts. Examples of these compounds are arsenic trioxide, ferrous oxide, ferric oxide, cobaltous oxide, aluminum hydroxide, aluminum oxide, zinc chloride, titanium tetrachloride, chromium nitrate, cupric chloride, cadmium oxide, and the respective oxides of gallium, indium, scandium, yttrium, lanthanum, germanium, lead, bismuth, cerium, praseodymium, neodymium and chromium.

Although the catalysts may be separately formed and used as pellets, it is more economical and practical to deposit this material on a carrier such as aluminum oxide. Before the carrier is combined with the catalyst the solution of catalyst is preferably concentrated to a solution which contains from about 30 to 80% volatiles and better results have been obtained when there is from about 50 to 70% volatiles by weight. The carrier may be added to the catalyst solution or the catalyst solution may be poured onto the carrier. Less desirably, the Alundum or other carrier may be present during the whole course of reactions to provide the desired vanadium-oxygen-phosphorus complex.

The support or carrier for the vanadium phosphate complex, if any, should preferably be inert to both the depositing solution containing the complex and should be inert under the catalytic oxidation conditions. The support provides not only the required surface for the catalyst, but gives physical strength and stability to the catalyst material. The carrier or support preferably has a low surface area, as usually measured, from about .001 to about 5 square meters per gram. A desirable form of carrier is one which has a dense non-absorbing center and a rough enough surface to aid in retaining the catalyst adhered thereto during handling and under reaction conditions. The carrier may vary in size but preferably is from about 2½ mesh to about 10 mesh in the Tyler Standard screen size. Alundum particles as large as ¼ inch are satisfactory. Carriers much smaller than 10 to 12 mesh normally cause an undesirable pressure drop in the reactor. Very useful carriers are Alundum and silicon carbide or Carborundum. Any of the Alundums or other inert alumina carriers of low surface may be used. Likewise, a variety of silicon carbides may be employed. Silica gel may be used. The amount of the catalyst complex on the carrier may be varied from about 10 to about 30 weight percent, and more preferably from about 14 to about 24 weight percent on an inert carrier such as Alundum. The amount of the catalyst complex deposited on the carrier should be enough to substantially coat the surface of the carrier and this normally is obtained with the ranges set forth above. With more absorbent carriers, larger amounts of material will be required to obtain essentially complete coverage of the carrier. In the case of silicon carbide, about 25 percent of catalyst is normally used. Excess catalyst over that required to coat the carrier surface is not necessary and usually will be lost by mechanical attrition. The final particle size of the catalyst particles which are coated on a carrier will also preferably be about 2½ to about 10 mesh size. The carriers may be of a variety of shapes, the preferred shape of the carriers is in the shape of cylinders or spheres. Although more economical use of the catalyst on a carrier in fixed beds is obtained, the catalyst may be employed in fluid bed systems. Of course, the particle size of the catalyst used in fluidized beds is quite small, varying from about 10 to about 150 microns and in such systems the catalyst normally will not be provided with a carrier but will be formed into the desired particle size after drying from solution.

Inert diluents such as silica may be present in the catalyst, but the combined weight of the vanadium, oxygen, phosphorus and phosphorus stabilizer should preferably constitute at least about 50 weight percent of the composition which is coated on the carrier, if any, and preferably these components constitute at least about 75 weight percent of the composition coated on the carrier, and more preferably at least about 95 weight percent. Any remainder other than the vanadium, oxygen, phosphorus and phosphorus stabilizer may be any inert non-catalytic ingredient intimately combined with the vanadium, oxygen, phosphorus and the phosphorus stabilizer as a part of the coating on the carrier.

Prior to use, the catalytic material may be placed in the reactor used to convert an olefin such as butene-2 to maleic anhydride and may, for example, be conditioned by passing butene-2 at the rate of 50 grams of butene-2 per liter of catalyst per hour in a concentration of 0.7 mole percent butene-2 in air over the catalyst. The temperature may be slowly raised over a period of 72 hours, to about 350° C. to 550° C. Thereafter, butene-2 in air may be passed over the catalyst, for example, at a concentration of about 1.2 mole percent butene-2 at the rate of 100 grams butene-2 per liter of catalyst per hour and the maleic anhydride product collected from the gaseous effluent from the reactor. Of course, the maleic anhydride produced may be collected beginning at the start of the conditioning period if desired.

The reaction, involving vapor phase oxidation of olefins to aliphatic dicarboxylic acid anhydrides requires only passing the olefin in low concentrations in air over the described catalyst. Once the reaction is begun, it is self-sustaining because of the exothermic nature thereof.

The flow rate of the gaseous stream through the reactor may be varied within rather wide limits, but a preferred range of operations is at the rate of about 50 to 300 grams of olefin per liter of catalyst per hour and more preferably about 100 to about 250 grams of olefin per liter of catalyst per hour. Residence times of the gas stream will normally be less than about 2 seconds, more preferably less than about one second, and down to a rate, which is easily determined, whereby less efficient operations are obtained.

A variety of reactors will be found to be useful and multiple tube heat exchanger type reactors are quite satisfactory. The tubes of such reactors may vary in diameter from about ¼ inch to about 3 inches, and the length may be varied from about 3 to about 10 or more feet. As mentioned, the oxidation reaction is an exothermic reaction and, therefore, relatively close control of the reaction temperature should be maintained. It is desirable to have the surface of the reactors at a relatively constant temperature and some medium to conduct heat from the reactors is necessary to aid temperature control. Such media may be Woods metal, molten sulfur, mercury, molten lead, and the like, but it has been found that eutectic salt baths are completely satisfactory. One such salt bath is a sodium nitrate-sodium nitrite-potassium nitrate eutectic constant temperature mixture. An additional method of temperature control is to use a metal block reactor whereby the metal surrounding the tube acts as a temperature regulating body. As will be recognized by the man skilled in the art, the heat exchange medium will be kept at the proper temperature by heat exchangers and the like. The reactor or reaction tubes may be iron, stainless steel, carbon-steel, nickel, glass tubes such as Vycor,[2] and the like. Both carbon-steel and nickel tubes have excellent long life under the conditions of the reactions described herein. Normally, the reactors contain a preheat zone of an inert material such as ¼ inch Alundum pellets, inert ceramic balls, nickel balls or chips and the like, present at about one-half to one-fourth the volume of the active catalyst present.

The temperature of reaction may be varied within some limits, but normally the reaction should be conducted at temperatures within a rather critical range. The oxidation reaction is exothermic and once reaction is underway, the main purpose of the salt bath or other media is to conduct heat away from the walls of the reactor and control the reaction. Better operations are normally obtained when the reaction temperature employed is no greater than about 100° C. above the salt bath temperature, under a given set of conditions, at which optimum conversion to maleic anhydride is obtained. The temperature in the reactor, of course, will also depend to some extent upon the size of the reactor and the olefin concentration. Under usual operating conditions, in compliance with the preferred procedure of this invention, the temperature in the center of the reactor, measured by thermocouple, is about 375° C. to about 550° C. The range of temperature preferably employed in the reactor, measured as above, should be from about 400° C. to about 515° C. and the best results are ordinarily obtained at temperatures from about 420° C. to about 500° C. Described another way, in terms of salt bath reactors with carbon steel reactor tubes, about 1.0 inch in diameter, the salt bath temperature should be controlled between about 350° C. to about 550° C. In any case, the optimum reaction temperature and salt bath temperature for maximum yield of desired dicarboxylic acid anhydride should be observed. Under normal conditions, the temperature in the reactor ordinarily should not be allowed to go above about 550° C. for extended lengths of time because of decreased yields and possible deactivation of the novel catalyst of this invention.

The dicarboxylic acid anhydrides may be recovered by a number of ways well known to those skilled in the art. For example, the recovery may be by direct condensation or by absorption in suitable media, with subsequent separation and purification of the dicarboxylic acid anhydride.

The pressure on the reactor is not generally critical, and the reaction may be conducted at atmospheric, superatmospheric or below atmospheric pressure. The exit pressure will be at least slightly higher than the ambient pressure to insure a positive flow from the reaction. The pressure of the inert gases must be sufficiently high to overcome the pressure drop through the reactor.

The exact nature of the final catalyst complexes is not known. However, the vanadium, oxygen, phosphorus and phosphorus stabilizer are chemically bonded together. Even though the exact nature of the catalyst is not known, the composition must be maintained within the prescribed limits. For example, when large amounts of molybdenum, such as one atom of molybdenum, is added to the catalyst containing one atom of vanadium and 1.1 to 1.6 atoms of phosphorus, the yield of maleic anhydride is significantly lowered. Not only is the composition of the catalyst important, but the method of preparation is influential on yield. With these catalysts containing the described proportions of vanadium, oxygen, phosphorus and phosphorus stabilizer, it has been discovered that materially higher yields of maleic anhydride result when the vanadium has an average valence of plus 4.6 or less, and generally less than 4.2 at the time the catalyst complex is combined with the carrier. The average valence of the vanadium is from about plus 2.5 up to 4.6. Vanadium with an average valence within these ranges can be obtained by adding a reducing acid such as oxalic or hydrochloric to $V_2O_5$. The blue color of the solution shows that the vanadium has an average valence of less than five. The reduction may be made either prior to, at the same time or after the addition of the phosphorus compound to form the complex. The preferred method is to reduce the vanadium prior to the addition of the phosphorus. However, as mentioned, the vanadium should have the average valence of 4.6 or less at the time the complex is combined with the carrier. If the vanadium has an average valence of about 5.0 and is in a concentrated system containing a relatively small amount of volatile liquid, the vanadium-oxygen phosphorus complex will precipitate out as a visible precipitate. Although the exact reasons are not understood, catalysts prepared in this manner result in relatively lower yields of maleic anhydride. In the preferred method of the present invention, the catalyst complex is deposited directly from solution onto the carrier without going through an intermediate precipitation step. That is, the catalyst complex is deposited as a solution onto the carrier. The atomic ratio of oxygen to the remaining components of the catalyst when the catalyst is being used to catalyze the oxidation of hydrocarbons to aliphatic dicarboxylic acids is difficult to determine and is probably not constant due to the competing reactions of oxidation and reduction taking place during the reaction.

The catalyst of the present invention and the process of using them are useful for the production of aliphatic dicarboxylic acid anhydrides from aliphatic hydrocarbons generally. Ethylenically unsaturated hydrocarbons of from 4 to 6 carbon atoms such as 3-methylbutene-1, isoprene, 2,3-dimethyl butadiene are also useful starting materials. The preferred starting materials are the four carbon hydrocarbons such as butene-1, cis or trans butene-2 and butadiene-1,3 and mixtures thereof. Useful feeds as starting materials may be mixed hydrocarbon streams such as refinery streams. For example, the feed material may be the olefin-containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominantly $C_4$ hydrocarbon stream may be produced and may comprise a mixture of butenes together with butadiene, butane, isobutane, isobutylene and other ingredients in minor amounts. These and other refinery by-products which contain normal ethylenically unsaturated hydrocarbons are useful as starting materials. Although various mixtures of hydrocarbons are useful, the preferred hydrocarbon feed contains at least 70 weight percent butene-1, butene-2 and/or butadiene-1,3 and mixtures thereof, and more preferably contains at least 95 percent butene-1, butene-2, and/or butadiene-1,3 and mixtures thereof. Any remainder will be aliphatic hydrocarbons.

The gaseous feed stream to the oxidation reactors normally will contain air and about 0.5 to about 2.5 mole percent hydrocarbons such as butene. About 1.0 to about 1.5 mole percent of the monoolefin are satisfactory for optimum yield of product for the process of this invention. Although higher concentrations may be employed, it should be noted that explosive hazards may be encountered at concentrations of butene-2 above about 2.0 percent and thus are generally avoided. Concentrations of butene-2 less than about one percent, of course, will reduce the total yields obtained at equivalent flow rates and thus are not normally economically employed. The source of the oxygen may be pure oxygen or synthetic or natural mixtures of oxygen and inert gases such as nitrogen or helium may be used. Dry air is entirely satisfactory.

The maleic anhydride product has many well known commercial uses such as a modifier for alkyd resins.

---
[2] Trade name of Corning Glass Works, Corning, N.Y., of a high silica glass composed of about 96 percent silica glass with the remainder being essentially $B_2O_3$.

In the following examples a quantity of 6 mm. x 6 mm. Vycor Raschig rings equivalent to about ¼ to ⅓ of the volume of the catalyst particles was loaded into the reactor on top of the catalyst particles (at the reactor inlet) to act as an inert preheat zone. Unless otherwise noted, the amount of catalyst composition coated on the carrier amounts to about 20 weight percent of the total weight of catalyst and carrier. In all of the examples, the percent of the phosphorus stabilizer is based on the total weight of $V_2O_5$ and $P_2O_5$ (or equivalent $H_3PO_4$) used. The butene feed in all of the examples (exclusive of air) contained approximately 97 mole percent butene-2 with the remainder being $C_3$ to $C_5$ hydrocarbon impurities. Except where otherwise noted the carrier particles used were ⅛ x ⅛ inch cylindrical Alundum which had been washed with hydrochloric acid. The yields of maleic anhydride are calculated on the mole percent of maleic anhydride formed per mole of butene fed. Yield values noted represent yields after the yield values had leveled out following the activation period. The reactor temperatures are the temperatures of the salt bath. In all of the examples the butene concentration is based on the combined moles of air and butene.

The examples are only illustrative and are not intended to limit the invention.

*Example 1*

A catalyst for oxidation of butene-2 to maleic anhydride was prepared as follows: 58.4 grams of vanadium pentoxide $V_2O_5$ was added to 600 milliliters of 37% hydrochloric acid. The mixture was refluxed slowly and after the initial reaction the mixture was refluxed for about 13 hours. After a blue solution was obtained, showing that the vanadium had an average valence of less than plus five, 3 g. of $ZnCl_2$ was added to the solution. Thereafter 61.6 g. of $P_2O_5$ was cautiously added to the solution and the mixture was again refluxed. The resulting deep blue solution was evaporated to about 205 milliliters, which solution weighed 278.5 gms. To the hot solution was added 480 grams of hydrochloric acid extracted ⅛ inch x ⅛ inch cylindrical Alundum pellets. The vanadium-oxygen-phosphorus complex was deposited on the Alundum and then dried. A free-flowing catalytic material was obtained which had the phosphorus-oxygen-vanadium uniformly deposited on the surface of the Alundum. The coated Alundum contained 20 weight percent of the complex based on the weight of carrier plus catalyst. The catalyst coating had an atomic ratio of 1.35 atoms of phosphorus to 1.0 atoms of vanadium and contained 2.5% $ZnCl_2$ based on the weight of the remaining catalytic coating.

300 ml. of the catalyst (428 gr.) were loaded into the bottom of a 3 foot long, ¾ inch I.D. nickel reactor tube surrounded by a salt bath. On top of the catalyst was loaded 70 ml. of 6 mm. x 6 mm. Vycor Raschig rings to form a preheat zone. A butene mixture containing 95 to 97 mole percent butene-2 together with the remainder being $C_3$ to $C_5$ hydrocarbon impurities was mixed with air to give a mixture containing about 0.7 mole percent butene-2. The mixture of butene and air was fed into the top of the reactor at a rate of 80 gr. of butene per liter of catalyst per hour. At a salt bath temperature of 490° C. the yield of maleic anhydride was 89.2 weight percent based on the weight of butene fed. The maleic anhydride was recovered by bubbling the gaseous stream through water.

*Example 2*

The general procedure of catalyst preparation and oxidation to maleic anhydride followed in Example 1 was repeated. The catalyst had an atomic ratio of 1.1 phosphorus, 1.0 vanadium and contained 0.775 weight percent of $Fe_2O_3$ based on the weight of the remaining catalytic ingredients. A 3 feet long, ¾ inch I.D. nickel tube reactor was used and was loaded with 300 ml. of the catalyst. A 1.0 mol percent butene-2 in air mixture was fed through the reactor at a rate of 100 grams of butene per liter of catalyst per hour. At a reactor temperature of 455° C. the yield of maleic anhydride was 84.8 weight percent based on the butene fed.

*Example 3*

Example 2 was repeated with the exception that the atomic ratio of the catalyst was 1.5 phosphorus to 1.0 vanadium and the $Fe_2O_3$ was present in a concentration of 1.5 weight percent. At 480° C. reactor temperature, the yield of maleic anhydride was 77.0 weight percent.

*Example 4*

The general procedure of Example 1 was repeated. The atomic ratio of the catalyst was 1.35 phosphorus and 1.0 vanadium and the $Fe_2O_3$ was present at a concentration of 1.25 weight percent. The reactor used was a 1.5 foot long, ¾ inch I.D. nickel reactor tube surrounded by a temperature regulating brass block. The concentration of butene was 1.1 mol percent and the butene-air mixture was fed at a rate of 108 grams of butene per liter of catalyst per hour. At a reactor temperature of 470° C. the yield of maleic anhydride was 82.2 weight percent.

*Example 5*

The general procedure of Example 2 was repeated with the catalyst having an atomic ratio of 1.35 phosphorus and 1.0 vanadium and which contained 1.5 weight percent $Co_2O_3$. A 3 foot long, ¾ inch I.D. nickel reactor tube surrounded by a salt bath was used. 300 ml. of the catalyst was used in the reactor. The butene-2 feed rate was 1.3 mol percent and the throughput was 143 grams of butene per liter per hour. At a reactor temperature of 515° C. the yield of maleic anhydride was 69.1 weight percent.

*Example 6*

The general procedure of Example 2 was repeated. The catalyst had an atomic ratio of 1.35 phosphorus and 1.0 vanadium and contained 1.5 weight percent NiO [added as $Ni(NO_3)_2$]. The same reactor was used as in Example 5 and the butene concentration of 1.3 mol percent with a feed rate of 148 grams of butene per liter of catalyst per hour. At a reactor temperature of 510° C. the yield of maleic anhydride was 73.5 weight percent.

*Example 7*

The general procedure of Example 2 was repeated. The same reactor was used as in Example 5. 300 ml. of a catalyst having an atomic ratio of 1.25 phosphorus and 1.0 vanadium and which contained 1.5 weight percent $Al(OH_3)_3$ were used. The concentration of butene was 1.3 mol percent and the feed rate was 142 grams of butene per liter of catalyst per hour. At a temperature of 503° C. the yield of maleic anhydride was 73.5 weight percent.

*Example 8*

The general procedure of Example 2 was repeated. The reactor used was a 6 foot long, ¾ inch I.D. iron reactor tube surrounded by a salt bath. Into the bottom of the reactor was charged 300 ml. of a catalyst having an atomic ratio of 1.2 phosphorus and 1.0 vanadium and which contained 0.7 weight percent $Fe_2O_3$. Thereafter 300 ml. of a catalyst having an atomic ratio of 1.42 phosphorus and 1.0 vanadium and which contained 0.7 weight percent $Fe_2O_3$ was charged. Both of these catalysts were coated on 4 to 8 mesh scraggy silicon carbide carrier instead of the Alundum used in the previous examples. In both of these catalysts the catalyst composition was present in a concentration of 25 weight percent of the combined weight of the catalyst and silicon carbide carrier. The concentration of butene fed was 1.1 mol percent and the feed rate was 92 grams of butene per liter of catalyst per hour. At a reactor temperature of 490° C. the yield of maleic anhydride was 89.2 weight percent.

Example 9

The general procedure of Example 2 was repeated. The reactor used was a 1.5 foot long, ¾ inch I.D. nickel reactor tube surrounded by a brass block. 150 ml. of a catalyst having an atomic ratio of 1.45 phosphorus and 1.0 vanadium and which contained 1.67 weight percent $ZnCl_2$ was used. The concentration of butene was 0.4 mol percent and the feed rate was 42 grams of butene per liter of catalyst per hour. At a temperature of 455° C. the yield of maleic anhydride was 86.4 weight percent.

Example 10

The general procedure of Example 2 was repeated. The reactor used was the same as in Example 11. 150 ml. of catalyst having an atomic ratio of 1.45 phosphorus and 1.0 vanadium and which contained 2.1 weight percent of $SnCl_2 \cdot 2H_2O$ was used. The concentration of butene was 0.4 mol percent with a feed rate of 56 grams of butene per liter of catalyst per hour. At a reactor temperature of 450° C., the yield of maleic anhydride was 84.0 weight percent.

Example 11

The general procedure of Example 2 was repeated. The same reactor was used as in Example 5. 300 ml. of a catalyst having an atomic ratio of 1.35 phosphorus and 1.0 vanadium and which contained 4.2 weight percent $TiCl_4$ was used. The concentration of butene was 0.9 mol percent and the feed rate was 96 grams of butene per liter of catalyst per hour. At a reactor temperature of 466° C. the yield of maleic anhydride was 88.4 weight percent.

Example 12

The same reactor was used as in Example 5. 300 ml. of a catalyst having an atomic ratio of 1.35 phosphorus and 1.0 vanadium and which contained 2.5 weight percent $ZnCl_2$ was used. The concentration of butene was 0.7 mol percent and the feed rate was 80 grams of butene per liter of catalyst per hour. At a reactor temperature of 490° C. the yield of maleic anhydride was 86.4 weight percent.

I claim:

1. In a process for the vapor phase catalytic oxidation of butene to provide maleic anhydride, the improvement which comprises effecting said catalytic oxidation in the presence of a catalyst complex comprising vanadium, oxygen, phosphorus and a metal selected from the group consisting of the metals of the fourth period of Group VIIIb and mixtures thereof, said catalyst containing from about 1.1 to about 1.6 atoms of phosphorus per atom of vanadium and containing from about 0.20 to about 2.0 weight percent of the said metals of the fourth period of Group VIIIb based on the total weight of vanadium, oxygen and phosphorus; the said catalyst having been deposited onto carrier particles while the vanadium has an average valence of no more than plus 4.6.

2. A process for the production of maleic anhydride which comprises passing in the vapor phase a mixture of butene and oxygen through a reactor packed with a catalyst, said catalyst being a vanadium-oxygen-phosphorus complex having chemically bonded therewith a phosphorus stabilizer selected from the group consisting of metals of the fourth period of Group VIIIb and mixtures thereof, said catalyst containing from about one to about two atoms of phosphorus per atom of vanadium and containing from about 0.05 to about 5.0 weight percent of the said phosphorus stabilizer based on the total weight of vanadium, oxygen and phosphorus; the said catalyst having been prepared in solution, by mixing a vanadium oxysalt wherein the salt-forming anion is an anion which is more volatile than the phosphate anion, with the said phosphorus stabilizer and a member selected from the group consisting of phosphoric acid and phosphorus pentoxide.

3. In a process for the vapor phase catalytic oxidation of butene to provide maleic anhydride, the improvement which comprises effecting said catalytic oxidation in the presence of a catalyst complex comprising vanadium, oxygen, phosphorus and a phosphorus stabilizer selected from the group consisting of the metals of the fourth period of Group VIIIb and mixtures thereof, said catalyst having from about 1.1 to about 1.6 atoms of phosphorus per atom of vanadium and having from about 0.05 to about 5.0 weight percent of the said phosphorus stabilizer based on the total weight of vanadium, oxygen and phosphorus; the said catalyst having been deposited on the carrier particles while the vanadium has an average valence of no more than plus 4.6.

4. A process according to claim 3 wherein the said catalyst is deposited on the carrier in an amount whereby the said catalyst amounts to about 10 to 30 weight percent of the total weight of catalyst plus carrier.

5. A process for the production of maelic anhydride which comprises passing in the vapor phase a mixture of butene and oxygen through a reactor packed with a catalyst, said catalyst comprising a vanadium-oxygen-phosphorus complex having chemically bonded therewith iron as a phosphorus stabilizer, said catalyst containing from about one to about two atoms of phosphorus per atom of vanadium and containing from about 0.05 to about 5.0 weight percent of the said iron based on the total weight of vanadium, oxygen and phosphorus, the said catalyst having been prepared in solution by mixing a vanadium oxysalt wherein the salt-forming anion is an anion which is more volatile than the phosphate anion, with the said iron and a member selected from the group consisting of phosphoric acid and phosphorus pentoxide.

6. A process for the production of maleic anhydride which comprises passing in the vapor phase a mixture of butene and oxygen through a reactor packed with a catalyst, said catalyst comprising a vanadium-oxygen-phosphorus complex having chemically bonded therewith cobalt as a phosphorus stabilizer, said catalyst containing from about one to about two atoms of phosphorus per atom of vanadium and containing from about 0.05 to about 5.0 weight percent of the said cobalt based on the total weight of vanadium, oxygen and phosphorus, the said catalyst having been prepared in solution by mixing a vanadium oxysalt wherein the salt-forming anion is an anion which is more volatile than the phosphate anion, with the said cobalt and a member selected from the group consisting of phosphoric acid and phosphorus pentoxide.

7. A process for the production of maleic anhydride which comprises passing in the vapor phase a mixture of butene and oxygen through a reactor packed with a catalyst, said catalyst comprising a vanadium-oxygen-phosphorus complex having chemically bonded therewith nickel as a phosphorus stabilizer, said catalyst containing from about one to about two atoms of phosphorus per atom of vanadium and containing from about 0.05 to about 5.0 weight percent of the said nickel based on the total weight of vanadium, oxygen and phosphorus, the said catalyst having been prepared in solution by mixing a vanadium oxysalt wherein the salt-forming anion is an anion which is more volatile than the phosphate anion, with the said nickel and a member selected from the group consisting of phosphoric acid and phosphorus pentoxide.

References Cited in the file of this patent

UNITED STATES PATENTS

| | | |
|---|---|---|
| 2,496,621 | Deery | Feb. 7, 1950 |
| 2,773,838 | Reid et al. | Dec. 11, 1956 |
| 2,920,049 | Romanovsky et al. | Jan. 5, 1960 |
| 2,938,874 | Rosinski | May 31, 1960 |
| 2,959,600 | Houben | Nov. 8, 1960 |
| 2,992,236 | Bavley et al. | July 11, 1961 |